United States Patent [19]

Bloch

[11] Patent Number: 4,676,267

[45] Date of Patent: Jun. 30, 1987

[54] HOSE REEL SWIVEL ASSEMBLY

[76] Inventor: Dale A. Bloch, Rte. #2, Box 158E, Peshtigo, Wis. 54157

[21] Appl. No.: 786,743

[22] Filed: Oct. 11, 1985

[51] Int. Cl.$^4$ .......................... A62C 35/00; F16L 3/00
[52] U.S. Cl. .......................... 137/355.27; 137/355.26; 242/86.2; 285/61; 285/276
[58] Field of Search .......................... 285/276, 94, 61; 137/355.26, 355.27; 242/86, 86.2

[56] References Cited

U.S. PATENT DOCUMENTS

| | | | |
|---|---|---|---|
| 1,808,066 | 6/1931 | Plummer | 285/61 |
| 2,490,353 | 12/1949 | Hannay | 285/61 |
| 2,512,006 | 6/1950 | Bagnard | 285/276 |
| 2,590,963 | 4/1952 | Hannay | 242/86.2 |
| 3,406,371 | 10/1968 | Buckeridge | 285/61 |

FOREIGN PATENT DOCUMENTS

| | | | |
|---|---|---|---|
| 1464086 | 12/1966 | France | 285/61 |
| 2014949 | 9/1979 | United Kingdom | 242/86 |

Primary Examiner—A. Michael Chambers
Attorney, Agent, or Firm—Michael, Best & Friedrich

[57] ABSTRACT

A hose reel assembly comprising a frame, a reel including a rotational axis, and a first conduit partially extending along the rotational axis, the first conduit having a first end extending from the reel, and a second end adapted to be connected to a hose to be wound around the reel, a part-spherical member including a center located on the rotational axis, and a first fluid passageway centered on the rotational axis, a swivel member including a second fluid passageway centered on the rotational axis, and a portion received within the part-spherical member for rotation of the swivel member relative to the part-spherical member about the rotational axis, the swivel member being fixedly connected to the first conduit with the second fluid passageway communicating with the first conduit and with the first fluid passageway, and clamping members for mounting the part-spherical member on the frame and for permitting gyrating movement of the part-spherical member relative to the frame, the clamping members defining a part-spherical pocket containing the part-spherical member.

24 Claims, 6 Drawing Figures

HOSE REEL SWIVEL ASSEMBLY

BACKGROUND OF THE INVENTION

The invention relates to hose reels, and, more particularly, to swivel apparatus used to connect a hose reel to its frame.

A typical hose reel assembly comprises a frame, a reel, and a swivel apparatus for mounting the reel on the frame. The reel includes a rotational axis and a conduit partially extending along the rotational axis, the conduit having one end extending from an end of the reel and another end adapted to be connected to a hose to be wound around the reel. The swivel apparatus must permit connection of a stationary conduit to the reel conduit while permitting rotation of the reel and reel conduit relative to the stationary conduit and frame.

A known swivel apparatus of this type includes a swivel joint connecting the stationary conduit to the reel conduit, and a self-aligning bearing (a generally spherical member mounted to permit limited gyration thereof about its center) through which the reel conduit passes. The swivel joint permits rotation of the reel conduit relative to the stationary conduit, and the self-aligning bearing supports the load of the reel and permits the stationary conduit to align itself with the reel conduit and to adjust for wobbling of the reel conduit.

SUMMARY OF THE INVENTION

The invention provides a hose reel assembly including an improved swivel apparatus. Specifically, the hose reel assembly comprises a frame, and a reel including a conduit partially extending along the rotational axis of the reel and having one end extending from an end of the reel, and another end adapted to be connected to a hose to be wound around the reel. The hose reel also comprises means for mounting both ends of the reel for rotation relative to the frame about the rotational axis of the reel. At the end of the reel from which the conduit extends, this mounting means includes the improved swivel apparatus of the invention.

The swivel apparatus comprises a part-spherical member having a center located on the rotational axis and including a first fluid passageway centered on the rotational axis. The first fluid passageway of the part-spherical member communicates with a stationary fluid conduit for supplying fluid to the reel. The apparatus also comprises a swivel member including a second fluid passageway centered on the rotational axis, and a portion received in the part-spherical member for rotation of the swivel member relative to the part-spherical member about the rotational axis. The swivel member is fixedly connected to the reel conduit for rotation therewith, and the second fluid passageway communicates with the reel conduit and with the first fluid passageway in the part-spherical member.

The swivel apparatus further comprises means defining a part-spherical pocket containing the part-spherical member for mounting the part-spherical member on the frame and for permitting gyrating movement of the part-spherical member relative to the frame. In other words, the mounting means permits the part-spherical member to rotate in any direction about its center. In the preferred embodiment, the mounting means includes means for limiting pivotal movement of the part-spherical member about the rotational axis so that the part-spherical member does not rotate with the swivel member and the reel.

Preferably, the mounting means includes a pair of interconnected clamping members having opposed, concave inner surfaces defining the part-spherical pocket, and the means for limiting pivotal movement of the part-spherical member about the rotational axis includes, in one of the clamping members, an opening, and, on the part-spherical member, a projection extending through the opening such that engagement of the projection with the clamping member limits pivotal movement of the part-spherical member.

Furthermore, in the preferred embodiment, the part-spherical member includes a generally cylindrical recess centered on the rotational axis and communicating with the first fluid passageway, and the portion of the swivel member received within the part-spherical member is generally cylindrical and is received in the cylindrical recess. Preferably, the recess has a generally cylindrical inner surface having therein an outer circumferential groove partially defining a bearing race, and the cylindrical portion of the swivel member has an outer surface having therein an inner circumferential groove aligned with the outer groove and further defining the bearing race. The hose reel preferably further comprises a plurality of ball bearings located in the bearing race.

The swivel apparatus of the invention is more compact and more economical than prior swivel apparatus. It is more compact and economical because, unlike in the prior art, the swivel joint and the self-aligning bearing are combined into a single structure (the part-spherical member serves as part of the self-aligning bearing and as half of the swivel joint). An advantage resulting from this arrangement is that the load carrying self-aligning bearing or part-spherical member is moved closer to the source of the load, the reel, thereby avoiding bending stresses on the swivel apparatus or stationary conduit.

Other features and advantages of the invention will become apparent to those skilled in the art upon review of the following detailed description, claims and drawings.

Figure 1:
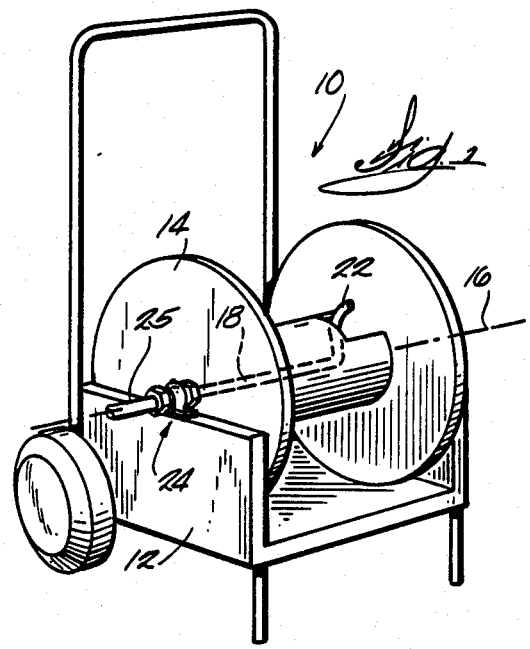
FIG. 1 is a perspective view of a hose reel embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 2:
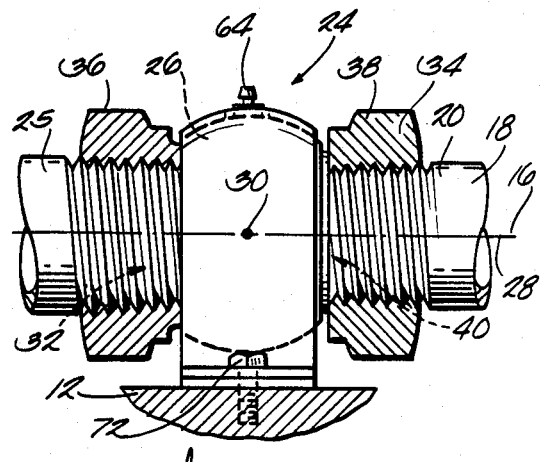
FIG. 2 is a side elevational view, partially in cross section, of the swivel apparatus.
Figure 3:
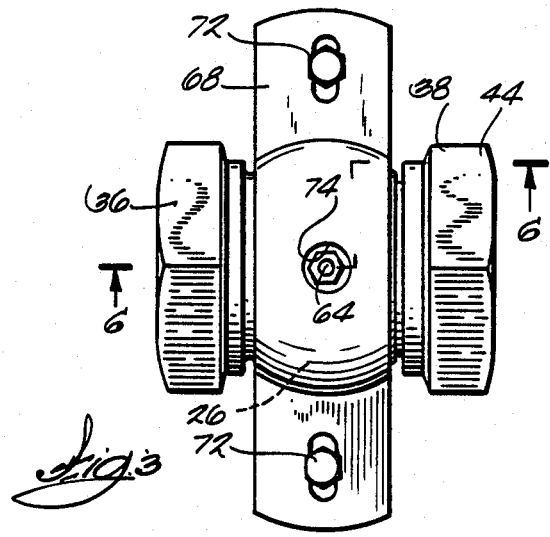
FIG. 3 is a top view of the swivel apparatus.
Figure 5:
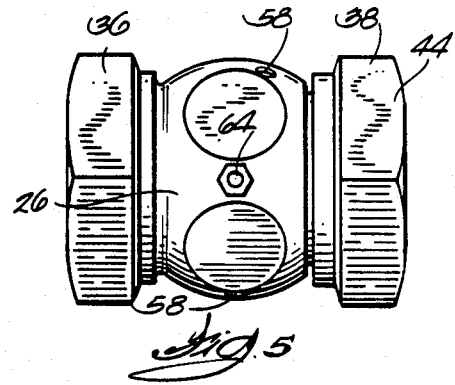
FIG. 5 is a top view of the swivel apparatus with the mounting means removed.
Figure 4:
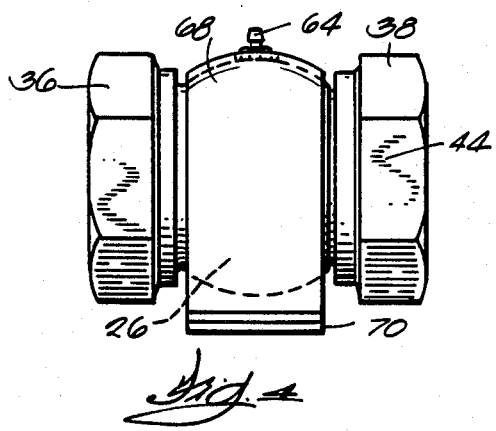
FIG. 4 is a side elevational view of the swivel apparatus.
Figure 6:
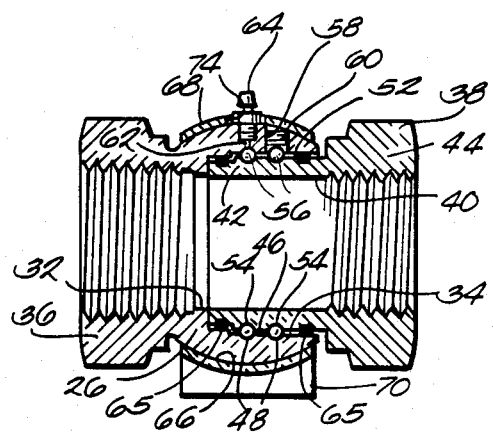
FIG. 6 is a cross-sectional view taken along line 6—6 in FIG. 3.

A hose reel assembly 10 embodying the invention is illustrated in the drawings. As best shown in FIG. 1, the hose reel assembly 10 comprises a frame 12, and a reel 14 including opposite first and second or left and right ends, a rotational axis 16 extending between the opposite ends, and a first or reel conduit 18 partially extending along the rotational axis 16 and having a first or left end 20 (FIG. 2) extending from the left end of the reel 14, and a second or right end 22 (FIG. 1) adapted to be connected to a hose to be wound around the reel 14. This construction is conventional and need not be described in greater detail.

The hose reel assembly 10 also comprises means (not shown) for mounting the right end of the reel 14 for rotation relative to the frame 12 about the rotational axis 16, and a swivel apparatus 24 for mounting the left end of the reel 14 for rotation relative to the frame 12 about the rotational axis 16, and for connecting the reel conduit 18 to a stationary conduit 25. In alternative embodiments, the reel 14 can include a second conduit (not shown) extending from the right end of the reel 14, and the right end mounting means can include a second swivel apparatus.

The swivel apparatus 24 comprises a part-spherical member 26 including a first axis 28 colinear with the rotational axis 16, a center 30 located on the first or rotational axis 16 (so that the first axis 28 passes through the center 30), and a first fluid passageway 32 centered on the rotational axis 16. In the preferred embodiment, the part-spherical member 26 has opposite right and left (as shown in the drawings) axial sides spaced in the direction of the first or rotational axis 16 and further includes a generally cylindrical recess 34 located in the right axial side of the part-spherical member 26. The cylindrical recess 34 is centered on the rotational axis 16 and communicates with the first fluid passageway 32. The part-spherical member 26 preferably also includes, on the left axial side thereof, means for connecting the first fluid passageway 32 to the stationary fluid conduit 25. In the preferred embodiment, the connecting means includes an integral nut-like portion 36 which is internally threaded. The stationary conduit 25 is preferably externally threaded and is screwed into the nut-like portion 36 of the part-spherical member 26.

The swivel apparatus 24 also comprises a swivel member 38 including a second fluid passageway 40 centered on the first or rotational axis 16, and a portion 42 received within the part-spherical member 26 for rotation of the swivel member 38 relative to the part-spherical member 26 about the rotational axis 16. The swivel member 38 is fixedly connected to the reel conduit 18 with the second fluid passageway 40 communicating with the reel conduit 18 and with the first fluid passageway 32. In the preferred embodiment, the portion 42 of the swivel member 38 received within the part-spherical member 26 is generally cylindrical and is received in the cylindrical recess 34 of the part-spherical member 26. Furthermore, the swivel member 38 preferably includes a nut-like portion 44 which is integrally connected to the cylindrical portion 42 and which is internally threaded. In the preferred embodiment, the left end 20 of the reel conduit 18 is externally threaded and is screwed into the nut-like portion 44.

In the preferred embodiment, the cylindrical recess 34 of the part-spherical member 26 has a generally cylindrical inner surface 46 having therein a pair of first or outer circumferential grooves 48 partially defining bearing races, and the cylindrical portion 42 of the swivel member 38 has an outer surface 52 having therein a pair of inner circumferential grooves 54 aligned with the outer grooves 48 and further defining the bearing races. The hose reel assembly 10 further comprises a plurality of ball bearings 56 located in the bearing races. Also, the part-spherical member 26 includes a pair of bearing openings 58 communicating with the outer grooves 52 for affording access to the bearing races, and means for removably closing the bearing openings 58. While various suitable closing means can be used, in the illustrated construction, the closing means includes set screws 60 secured in the bearing openings 58. The part-spherical member 26 preferably further includes a lubricant passageway 62 communicating with the cylindrical recess 34 to permit lubrication of the ball bearings 56, and a grease fitting 64 secured in the lubricant passageway 62. Annular sealing members 65 prevent lubricant from escaping from the recess 34.

The swivel apparatus 24 further comprises means defining a part-spherical pocket 66 containing the part-spherical member 26 for mounting the part-spherical member 26 on the frame 12 and for permitting gyrating movement of the part-spherical member 26 relative to the frame 12. In other words, the mounting means permits the part-spherical member 26 to rotate in any direction about its center 30. While various suitable mounting means can be employed, in the preferred embodiment, the mounting means includes upper and lower interconnected clamping members 68 and 70, respectively, having opposed, concave inner surfaces defining the part-spherical pocket 66. The clamping members 68 and 70 are preferably secured to the frame 12 by a pair of bolts 72.

In the preferred embodiment, the mounting means includes means for limiting pivotal movement of the part-spherical member 26 about the rotational axis 16 so that the part-spherical member 26 does not rotate with the reel 14 relative to the frame 12. While various suitable means for limiting pivotal movement of the part-spherical member 26 can be used, in the illustrated construction, such means includes, in one of the clamping members, an opening 74, and, on the part-spherical member 26, a projection extending through the opening 74 such that engagement of the projection with the clamping member limits pivotal movement of the part-spherical member 26. In the preferred embodiment, the opening 74 is located in the upper clamping member 68, and the projection is the grease fitting 64.

The part-spherical member 26 and swivel member 38 are assembled as follows. First, the cylindrical portion 42 of the swivel member 38 is inserted into the cylindrical recess 34 of the part-spherical member 26. Second, the ball bearings 56 are loaded into the bearing races via the bearing openings 58. Third, the set screws 60 are threaded into the bearing openings 58.

The swivel apparatus 24 operates as follows. With the end of the stationary conduit 25 threaded into the nut-like portion 36 of the part-spherical member 26, and with the left end 20 of the reel conduit 18 threaded into the nut-like portion 44 of the swivel member 38, the swivel member 38 rotates with the reel 14 relative to the part-spherical member 26. Engagement of the grease fitting 64 with the upper clamping member 68 prevents rotation of the part-spherical member 26 with the swivel member 38. The clamping members 68 and 70 permit gyrating movement of the part-spherical member 26 relative to the frame 12 to adjust for wobbling of the reel 14.

Various other features and advantages of the invention are set forth in the following claims.

I claim:

1. A hose reel assembly comprising
    a frame,
    a reel including a rotational axis, and a first conduit partially extending along said rotational axis, said first conduit having a first end extending from said reel, and a second end adapted to be connected to a hose to be wound around said reel,
    a part-spherical member including a center located on said rotational axis, and a first fluid passageway centered on said rotational axis,
    a swivel member including a portion rotatably housed within said part-spherical member in fluid tight relation for rotation of said swivel member relative to said part-spherical member about said rotational axis, and a second fluid passageway centered on said rotational axis and extending through said portion, said swivel member being fixedly connected to said first conduit with said second fluid passageway communicating with said first conduit and with said first fluid passageway, and
    means for mounting said part-spherical member on said frame and for permitting gyrating movement of said part-spherical member relative to said frame, said mounting means defining a part-spherical pocket containing said part-spherical member.

2. A hose reel assembly as set forth in claim 1 wherein said mounting means includes interconnected clamping members having opposed, concave inner surfaces defining said part-spherical pocket.

3. A hose reel assembly as set forth in claim 2 wherein said mounting means includes means for limiting pivotal movement of said part-spherical member about said rotational axis.

4. A hose reel assembly as set forth in claim 3 wherein said means for limiting pivotal movement includes, in one of said clamping members, an opening, and, on said part-spherical member, a projection extending through said opening such that engagement of said projection with said one of said clamping members limits pivotal movement of said part-spherical member.

5. A hose reel assembly as set forth in claim 1 wherein said part-spherical member further includes a generally cylindrical recess centered on said rotational axis and communicating with said first fluid passageway, and wherein said portion of said swivel member is generally cylindrical and is received in said recess.

6. A hose reel assembly as set forth in claim 5 wherein said cylindrical recess has a generally cylindrical inner surface having therein a first circumferential groove partially defining a bearing race, wherein said cylindrical portion of said swivel member has an outer surface having therein a circumferential groove aligned with said first groove and further defining said bearing race, and wherein said hose reel further comprises a plurality of ball bearings located in said bearing race.

7. A hose reel assembly as set forth in claim 6 wherein said part-spherical member further includes a bearing opening communicating with said first groove for affording access to said bearing race, and means for removably closing said bearing opening.

8. A hose reel assembly as set forth in claim 6 wherein said part-spherical member further includes a lubricant passageway communicating with said cylindrical recess.

9. A hose reel assembly as set forth in claim 8 wherein said part-spherical member further includes a grease fitting secured in said lubricant passageway.

10. A swivel apparatus comprising
    a part-spherical member including a center, a first axis passing through said center, and a first fluid passageway centered on said first axis,
    a swivel member including a portion rotatably housed within said part-spherical member in fluid tight relation for rotation of said swivel member relative to said part-spherical member about said first axis, and a second fluid passageway centered on said first axis, extending through said portion, and communicating with said first fluid passageway, and
    means for mounting said part-spherical member on a supporting surface and for permitting gyrating movement of said part-spherical member relative to the supporting surface, said mounting means defining a part-spherical pocket containing said part-spherical member.

11. An apparatus as set forth in claim 15 10 wherein said mounting means includes interconnected clamping members having opposed, concave inner surfaces defining said part-spherical pocket.

12. An apparatus as set forth in claim 15 11 wherein said mouting means includes means for limiting pivotal movement of said part-spherical member about said first axis.

13. An apparatus as set forth in claim 17 12 wherein said means for limiting pivotal movement of said part-spherical member includes, in one of said clamping members, an opening, and, on said part-spherical member, a projection extending through said opening such that engagement of said projection with said one of said clamping members limits pivotal movement of said part-spherical member.

14. An apparatus as set forth in claim 10 wherein said part-spherical member further includes a generally cylindrical recess centered on said first axis and communicating with said first fluid passageway, and wherein said portion of said swivel member is generally cylindrical and is received in said recess.

15. An apparatus as set forth in claim 14 wherein said cylindrical recess has a generally cylindrical inner wall having therein a first circumferential groove partially defining a bearing race, wherein said cylindrical portion of said swivel member has an outer surface having therein a circumferential groove aligned with said first groove and further defining said bearing race, and wherein said swivel apparatus further comprises a plurality of ball bearings located in said bearing race.

16. An apparatus as set forth in claim 15 wherein said part-spherical member further includes a bearing opening communicating with said first groove for affording access to said bearing race, and means for removably closing said bearing opening.

17. An apparatus as set forth in claim 15 wherein said part-spherical member further includes a lubricant passageway communicating with said cylindrical recess.

18. An apparatus as set forth in claim 17 wherein said part-spherical member further includes a grease fitting secured in said lubricant passageway.

19. A swivel apparatus as set forth in claim 14 wherein said part-spherical member has opposite axial sides spaced in the direction of said first axis, wherein said cylindrical recess is located in one axial side of said part-spherical member, and wherein said part-spherical member includes, on the other axial side thereof, means for connecting said first fluid passageway to a fluid conduit.

20. A swivel apparatus comprising a part-spherical member including a center, a first axis passing through said center, opposite axial sides spaced in the direction of said first axis, a projection extending outwardly from said part-spherical member, a first fluid passageway centered on said first axis, means on one axial side of said part-spherical member for connecting said first fluid passageway to a conduit, and a generally cylindrical recess located in the other axial side of said part-spherical member and centered on said first axis, said recess communicating with said first fluid passageway and having a generally cylindrical wall having therein a first circumferential groove partially defining a bearing race, a swivel member including a second fluid passageway centered on said first axis and communicating with said first fluid passageway, and a generally cylindrical portion received in said cylindrical recess for rotation of said swivel member relative to said part-spherical member, said cylindrical portion having an outer surface having therein a circumferential groove aligned with said first groove and further defining said bearing race, means for mounting said part-spherical member on a supporting surface and for permitting gyrating movement of said part-spherical member relative to the supporting surface, said mounting means including a pair of interconnected clamping members having opposed, concave inner surfaces defining a part-spherical pocket containing said part-spherical member, one of said clamping members having therein an opening with said projection extending through said opening such that engagement of said projection with said one of said clamping members limits pivotal movement of said first member, and a plurality of ball bearings located in said bearing race.

21. An apparatus as set forth in claim 20 wherein said part-spherical member further includes a bearing opening communicating with said first groove for affording access to said bearing race, and means for removably closing said bearing opening.

22. An apparatus as set forth in claim 20 wherein said part-spherical member further includes a lubricant passageway communicating with said cylindrical recess.

23. An apparatus as set forth in claim 22 wherein said part-spherical member further includes a grease fitting secured in said lubricant passageway.

24. An apparatus as set forth in claim 23 wherein said projection includes said grease fitting.

* * * * *